(12) United States Patent
Sylthe et al.

(10) Patent No.: US 8,584,037 B2
(45) Date of Patent: *Nov. 12, 2013

(54) METHOD FOR REQUESTING AND VIEWING A ZOOMED AREA OF DETAIL FROM AN IMAGE ATTACHMENT ON A MOBILE COMMUNICATION DEVICE

(75) Inventors: Olav A. Sylthe, Oslo (NO); Jianwei (Oliver) Yuan, Cumming, GA (US); Dan Dumitru, Atlanta, GA (US)

(73) Assignee: BlackBerry Limited, Waterloo (CA)

( * ) Notice: Subject to any disclaimer, the term of this patent is extended or adjusted under 35 U.S.C. 154(b) by 28 days.

This patent is subject to a terminal disclaimer.

(21) Appl. No.: 13/467,749

(22) Filed: May 9, 2012

(65) Prior Publication Data

US 2012/0218269 A1 Aug. 30, 2012

Related U.S. Application Data

(63) Continuation of application No. 12/199,230, filed on Aug. 27, 2008, now Pat. No. 8,196,062, which is a continuation of application No. 10/941,763, filed on Sep. 15, 2004, now Pat. No. 7,451,405.

(51) Int. Cl.
*G06F 3/00* (2006.01)

(52) U.S. Cl.
USPC ........... 715/800; 715/788; 715/798; 715/801; 715/815; 715/864

(58) Field of Classification Search
USPC .................. 715/800, 788, 815, 798, 799, 864
See application file for complete search history.

(56) References Cited

U.S. PATENT DOCUMENTS

| | | |
|---|---|---|
| 5,260,898 A | 11/1993 | Richardson |
| 5,828,591 A | 10/1998 | Rotstain |
| 6,006,231 A | 12/1999 | Popa |
| 6,054,990 A | 4/2000 | Tran |
| 6,223,183 B1 | 4/2001 | Smith et al. |
| 6,281,874 B1 | 8/2001 | Sivan et al. |
| 6,553,394 B1 | 4/2003 | Perry et al. |

(Continued)

FOREIGN PATENT DOCUMENTS

| | | |
|---|---|---|
| EP | 1202188 | 5/2002 |
| JP | 200391410 A | 3/2003 |
| WO | 0233976 A1 | 4/2008 |

OTHER PUBLICATIONS iseemedia Zoom image server 4.6 readme. retrieved from the internet on Jan. 10, 2007: URL: http://web.archive.org/web/20030417002817/iseemedia.com/zoom/benifits.html.

(Continued)

*Primary Examiner* — Omar Abdul-Ali
*Assistant Examiner* — Sherrod Keaton
(74) *Attorney, Agent, or Firm* — Novak Druce Connolly Bove + Quigg LLP

(57) ABSTRACT

A process is set forth for viewing an enlarged area of an image. The image is stored on a server and re-sized for viewing on a mobile communication device based on screen size and color display capabilities of the device. The image is enlarged within the server by modifying binary raw data of the original image based on crop rectangle coordinates entered at the mobile communication device. The process allows users to quickly retrieve any relevant part of a large image attachment that has been resized by the server. This minimizes bandwidth usage, device memory/CPU consumption, and request/response latency while still allowing the user to view an image area in its original level of detail.

8 Claims, 8 Drawing Sheets

(56) References Cited

U.S. PATENT DOCUMENTS

| | | |
|---|---|---|
| 6,674,439 B1 | 1/2004 | Shin et al. |
| 6,700,589 B1 | 3/2004 | Canelones et al. |
| 6,738,800 B1 | 5/2004 | Aquilon et al. |
| 7,038,701 B2 | 5/2006 | Niemi |
| 7,072,984 B1 | 7/2006 | Polonsky et al. |
| 7,209,149 B2 | 4/2007 | Jogo |
| 7,565,604 B2 | 7/2009 | Makela |
| 2001/0032238 A1 | 10/2001 | Hornbaker et al. |
| 2002/0073119 A1 | 6/2002 | Richard |
| 2002/0078131 A1 | 6/2002 | Dowd et al. |
| 2002/0092029 A1 | 7/2002 | Smith |
| 2003/0007695 A1 | 1/2003 | Bossut et al. |
| 2003/0063090 A1 | 4/2003 | Kraft et al. |
| 2003/0103247 A1 | 6/2003 | Masera et al. |
| 2004/0003117 A1 | 1/2004 | McCoy et al. |
| 2004/0177327 A1 | 9/2004 | Kieffer |
| 2005/0185000 A1 | 8/2005 | Nonaka |
| 2005/0223027 A1 | 10/2005 | Lawrence et al. |
| 2006/0033809 A1 | 2/2006 | Farley |
| 2006/0039478 A1 | 2/2006 | Nonaka |
| 2006/0167840 A1 | 7/2006 | Sundstrom |

OTHER PUBLICATIONS iseemedia Zoom image server benefits: Retrieved from the internet on Jan. 16, 2007: URL:http://hitachi-hap-la.com:8087/obj=delivery, 1.0&fif=servercomponents/readme.htm&cmd=retrieve.

Li, X "DOM-Based information Extraction for the Web Source," Chinese J. Computers, vol. 25, No. 5, May 2002, pp. 526-533, China Academic Journal Electronic Publishing House (1994-2007), htpp://www.cnki.net.

Research in Motion 2002; Attachment Services; pp. 1-6.

Ma, Wei-Ying et al. A framework for adaptive content delivery in Heterogeneous Network Environments, XP-002168331, 14 pp.

English Abstract for JP200391410 published on Mar. 28, 2003 and retrieved on Jan. 31, 2008.

Office Action mailed Jun. 7, 2012, in corresponding Canadian patent application No. 2,518,672.

This document has subdocument of images like this one .

Second paragraph contains the same image .

METHOD FOR REQUESTING AND VIEWING A ZOOMED AREA OF DETAIL FROM AN IMAGE ATTACHMENT ON A MOBILE COMMUNICATION DEVICE

CROSS-REFERENCE TO RELATED APPLICATION

This application is a continuation of U.S. patent application Ser. No. 12/199,230, filed Aug. 27, 2008 and entitled "Method for Requesting and Viewing a Zoomed Area of Detail form an Image Attachment on a Mobile Communication Device," which is a continuation of U.S. Pat. No. 7,451,405 issued Nov. 11, 2008 (application Ser. No. 10/941,763, filed Sep. 15, 2004), and entitled "Method of Requesting and Viewing a Zoomed Area of Detail form an Image Attachment on a Mobile Communication Device," each of which is expressly incorporated by reference herein in its entirety.

BACKGROUND OF THE INVENTION

1. Field of the Invention

The following is directed in general to displaying content on mobile communication devices, and more particularly to a method for viewing an area of detail from an image attachment on a mobile communication device.

2. Brief Description of the Prior Art

Mobile communication devices are becoming increasingly popular for business and personal use due to a relatively recent increase in number of services and features that the devices and mobile infrastructures support. Handheld mobile communication devices, sometimes referred to as mobile stations, are essentially portable computers having wireless capability, and come in various forms. These include Personal Digital Assistants (PDAs), cellular phones and smart phones. While their reduced size is an advantage to portability, limitations in download bandwidth and device screen size give rise to challenges in viewing large images having high horizontal and vertical resolution (in pixels). Examples include digital pictures and fax attachments to an email, which typically can have resolutions in the 2000×2000 pixel range.

For wireless devices that support viewing of image attachments, this represents a large amount of information for downloading, requiring a large amount of bandwidth and associated cost thereof. Additionally, the user must wait for an extended period of time while the device is downloading the image.

Since mobile communication devices have limited screen real estate, the downloaded image must be resized on the device in order to be viewable. However, such a resizing operation requires a very large memory and CPU usage thereby affecting the performance of all other applications on the device for the duration of the resizing process.

Companies such as Mapquest® allow users to zoom in on a map from a web browser client such that the map regenerates with a higher amount of detail. This zoom feature is accomplished in a web client/server implementation using vector graphics, which is not applicable to viewing wireless image attachments.

SUMMARY OF THE INVENTION

According to an aspect of the invention, a method is provided for allowing a user to quickly view an image attachment downloaded from a server to a mobile communication device. Unlike the prior art systems discussed above, the method of the invention relates to wireless image attachment viewing, and the server side processing is performed on bitmap data and not vectors.

When a user issues a request to view a large image such as a fax or digital photo image, the server resizes the image to match the requesting device display resolution. For example, if the user requests a large fax image (e.g. 2400×1800 pixel resolution), the client device (i.e. mobile communication device) informs the server of its maximum resolution (e.g. 240×240 pixels), in response to which the server resizes the image and returns the reduced resolution image to the device for viewing. This significantly reduces the amount of data downloaded wirelessly to the device as well as device memory consumed and CPU usage required to display the image.

Additionally, the server adjusts the number of colors in the image to match the color display capabilities of the requesting device. For example, only monochrome images will be returned to a monochrome device even if the requested image is in color, thereby further reducing the amount of data downloaded wirelessly to the device.

One consequence of the server image resizing operation is decreased legibility of textual information and image details when viewed on the device, due to the reduced image resolution. Therefore, according to an additional aspect of the invention, the client includes an "Enlarge Area" feature by which the user may zoom in on an area of detail of the resized image being viewed on the device, and request the server to provide higher resolution of the enlarged detail. The "Enlarge Area" operation is performed in an iterative fashion making it possible to zoom in on a returned area of detail previously requested and thereby obtain an even higher area of detail.

Additional aspects and advantages will be apparent to a person of ordinary skill in the art, residing in the details of construction and operation as more fully hereinafter described and claimed, reference being had to the accompanying drawings.

BRIEF DESCRIPTION OF THE DRAWINGS

A detailed description of the preferred embodiment is set forth in detail below, with reference to the following drawings, in which.

DETAILED DESCRIPTION OF THE PREFERRED EMBODIMENT

Figures 1, 2:
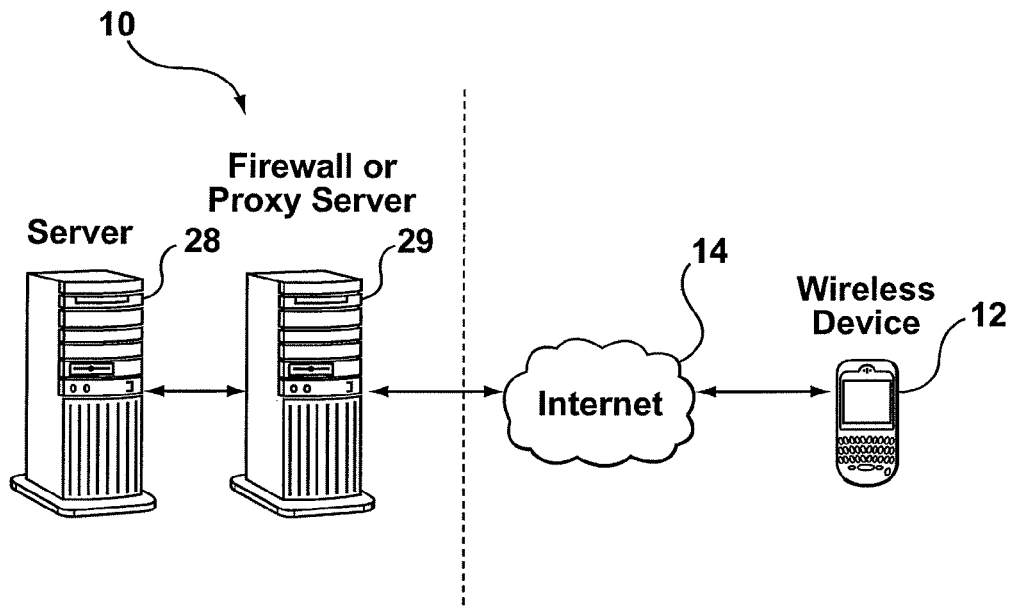
FIG. 1 is a block diagram of a network environment in which the preferred embodiment may be practiced.
FIG. 2 is a screen display of a menu for selecting the enlarge area command according to the preferred embodiment.

With reference to FIG. 1, network environment 10 is shown in which the preferred embodiment may be practiced. Network environment 10 includes at least one mobile communication device 12 communicating via a wireless network/Internet 14 to a server 28, via a firewall security server 29, for downloading document attachments to the devices 12. While only one server 28 is shown for illustration purposes, a person of skill in the art will understand that network environment 10 could have many such servers for hosting web sites or graphic download sites, providing access to picture files such as JPEG, TIFF, BMP, PNG, SGI, MP4, MOV, GIF, SVG, etc. As would be understood by one of ordinary skill in the art, wireless networks 14 include GSM/GPRS, CDPD, TDMA, iDEN Mobitex, DataTAC networks, or future networks such as EDGE or UMTS, and broadband networks like Bluetooth and variants of 802.11.

As discussed above, when the user of a mobile communication device 12 views an image attachment using an "Attachment Viewer" application, a server side resized version of the original image is downloaded to the device unless the original image has a smaller width and height than the requesting device screen size. The server 28 resizes the image to be viewed based on the requesting device screen width and height (in pixels). When the server 28 returns the resized image back to the device 12 for viewing, the dimensions (width×height) of the original image are also returned to the device. The original dimensions are required for calculating the cropping rectangle for the "Enlarge Area" command, as discussed in greater detail below.

Specifically, while viewing an image in the Attachment Viewer the user can select to zoom in on an image, which effectively magnifies the existing pixels that constitute the image on the device 12. The "Enlarge Area" command causes the server 28 to generate a new image based on the coordinates from the zoomed in image on the device 12 and returns the new image to the device 12 for display.

With reference to FIG. 2, the "Enlarge Area" menu item is displayed in the device menu if the following conditions are met: (A) there is no pending "Enlarge Area" request in process for the currently viewed image and (B) the crop rectangle based on the currently zoomed image area on the device is calculated to equate to the original image coordinates as it resides on the server in pixels and the calculated crop rectangle width is greater than the device screen width or the calculated crop rectangle height is bigger than the device screen height.

Provided the foregoing conditions are met, the Attachment Viewer application on device 12 issues a request to the server 28 for the Enlarge Area operation to be performed on the original image stored on the server.

When sending the request, the Attachment Viewer application includes a cropping rectangle for the original image stored on the server 28, which corresponds to the currently viewed zoomed image area on the device 12. Thus, with reference to FIG. 2, the cropping rectangle is the viewable area (left-hand side) that the user wishes to see returned from the server 28 with higher quality/resolution (right-hand side).

Figure 3:
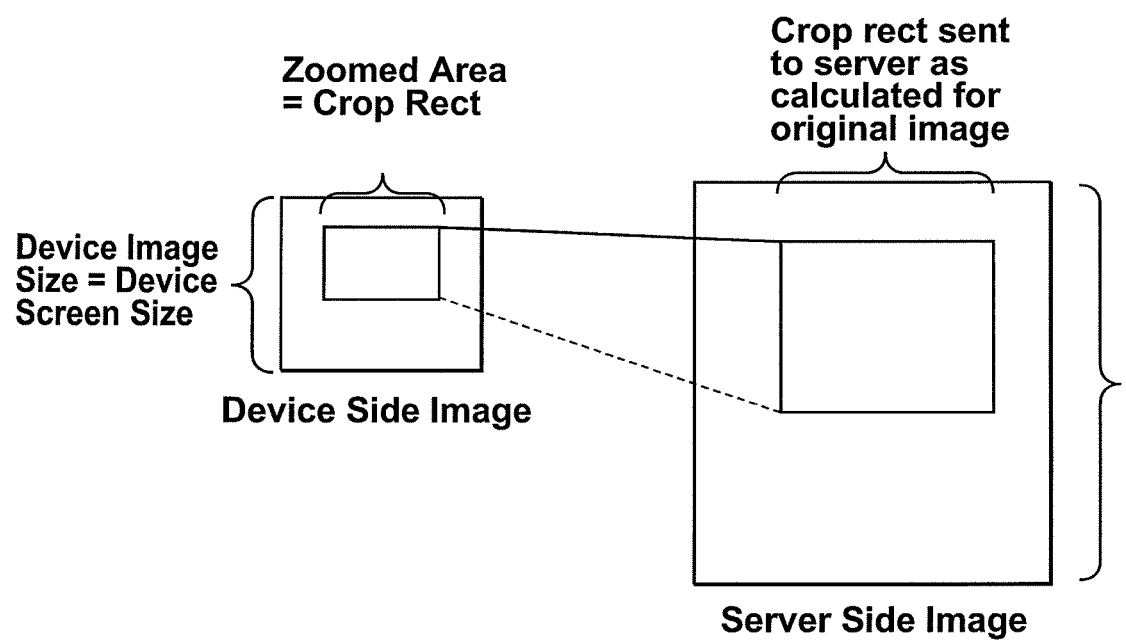
FIG. 3 shows image crop rectangle coordinates established at the device and sent to the server.

The crop rectangle coordinates are the zoomed area coordinates on the device 12 calculated so they translate to the equivalent crop rectangle for the original image stored on the server 28, as shown in FIG. 3.

The crop rectangle calculation also correctly allows for device side operations such as "Rotate" of the device side image prior to the "Enlarge Area" command being issued. The Attachment Viewer also sends the device screen characteristics of width, height and depth along with the calculated crop rectangle for the original image when sending the Enlarge Area command to the server 28. The Attachment Server application then returns the new image resulting from the enlarge area command for matching these device characteristics.

Figure 4:
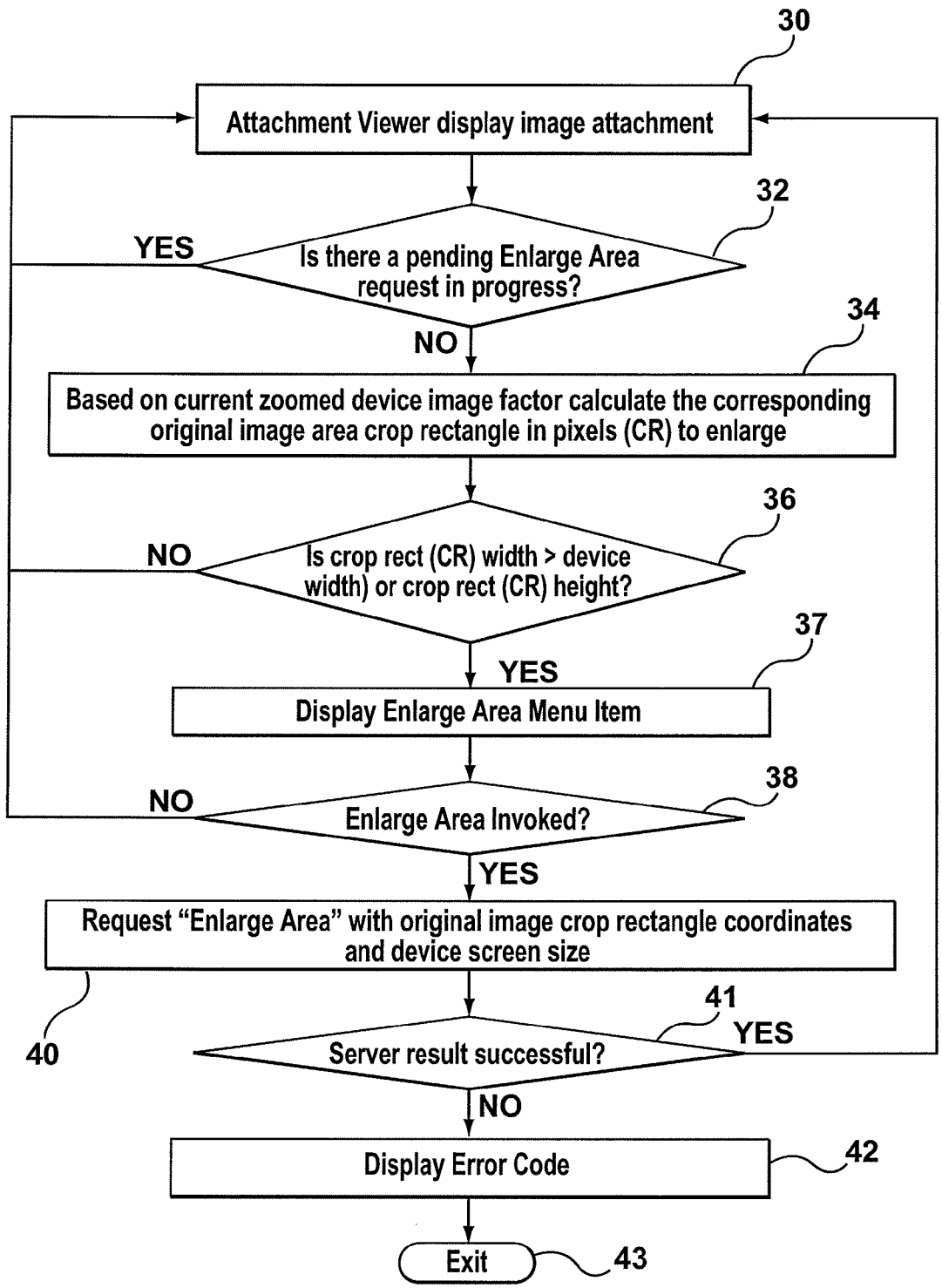
FIG. 4 is a flowchart showing an "Enlarge Area" request function on the device, according to the preferred embodiment.

FIG. 4 shows the device side "Enlarge Area" command request procedure of the Attachment Viewer application running on device 12. At step 30, the Attachment Viewer displays an image attachment downloaded from the server 28. As discussed above, the image is re-sized in the server if the dimensions exceed the screen size of the viewing device 12. Also, as discussed above, the server 28 returns the original image size to the device for calculating the crop rectangle.

Next, at step 32, the application determines whether precondition (A), above, is met for generating the "Enlarge Area" menu item (i.e. whether there is any pending Enlarge Area request in progress).

The crop rectangle coordinates are then calculated based on the image zoom area defined on the device and translated using the original image dimensions to crop rectangle coordinates for the original image stored on the server 28 (step 34).

Condition (B), discussed above, is then tested at step 36 and, provided that the image width or height exceeds the device display width or height, respectively, then the "Enlarge Area" menu is displayed (step 37), and a determination is made as to whether the "Enlarge Area" command has been invoked (step 38).

At step 40, the device sends a request to the server 28 to enlarge the displayed image based on the translated crop rectangle coordinates and the device screen dimensions.

If the enlarged image is received from the server 28 (a YES at decision block 41), then process control returns to step 30. Otherwise, an error code is displayed (step 42) and the process terminates (step 43).

Before turning to the server-side application for image area enlargement, a description is provided herein of the structure of a Document Object Model (DOM) for a document attachment to be viewed on the mobile communication device 12.

The attachment server 28 uses a file-parsing distiller in the preferred embodiment, for a specific document type, to build an in-memory Document Object Model ("DOM") structure representing an attachment of that document type. The document DOM structure is stored in a memory cache of server 28, and can be iterated bi-directionally.

Figure 5:
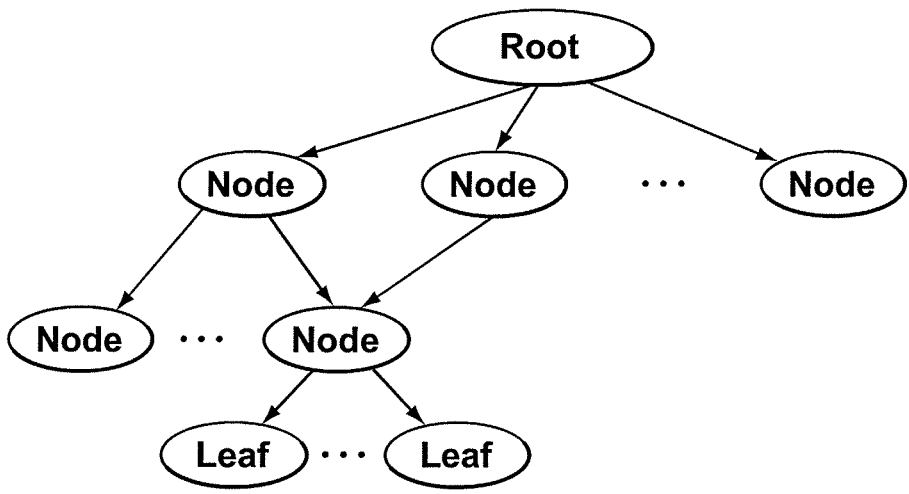
FIG. 5 is a tree diagram showing the basic structure of a Document Object Model ("DOM") used in the preferred embodiment.

As shown in FIG. 5, the graph-based document DOM structure consists of nodes and leaves. The nodes serve as the parents of leaves and nodes, while leaves are end points of a branch in the graph. Each node and leaf can have a set of attributes to specify its own characteristics. For example, a paragraph node can contain attributes to specify its alignment, style, entry of document TOC, etc. In addition, each of the nodes and the leaves has a unique identifier, called a DOM ID, to identify itself in the document DOM structure.

The document DOM structure is divided into three parts: top-level, component and references. The top level refers to the document root structure, while the main document is constructed in the component and the references represent document references to either internal or external sub-document parts. The following paragraphs examine each part in detail.

Figure 6:
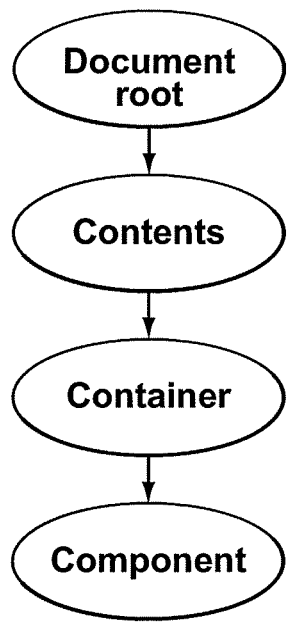
FIG. 6 shows the top-level of the DOM structure in FIG. 5.

The root node of a document DOM structure, referred to as "Document", contains several children nodes, referred to as "Contents", which represent different aspects of the document contents. Each "Contents" node contains one or multiple "Container" nodes used to store various document global attributes. The children of the "Container" nodes are components, which store the document structural and navigational information. When the attachment server 28 builds the DOM structure for an attachment file for the first time, the top-level structure is a single parent-child chain as shown in FIG. 6.

Three types of components are defined by the attachment server 28: text components, table components and image components, which represent text, tables, and images in a document, respectively. The text and table components are described in detail below, and the image component structure is identical.

A component consists of a hierarchy of command nodes. Each command represents a physical entity, a property, or a reference defined in a document. For the text component, the physical entity commands are page, section, paragraph, text segments, comments, footnote and endnote commands which by name define the corresponding entity contained in a document. The property commands for the text component are font, text color, text background color, hyperlink start/end and bookmark commands. The text component has only one reference command, referred to as the text reference command, which is used to reference a subdocument defined in the main body of a document. Usually, the children of a text component are page or section command nodes that, in turn, comprise a set of paragraph command nodes. The paragraph command can contain one or multiple nodes for the remaining command types.

Figure 7:
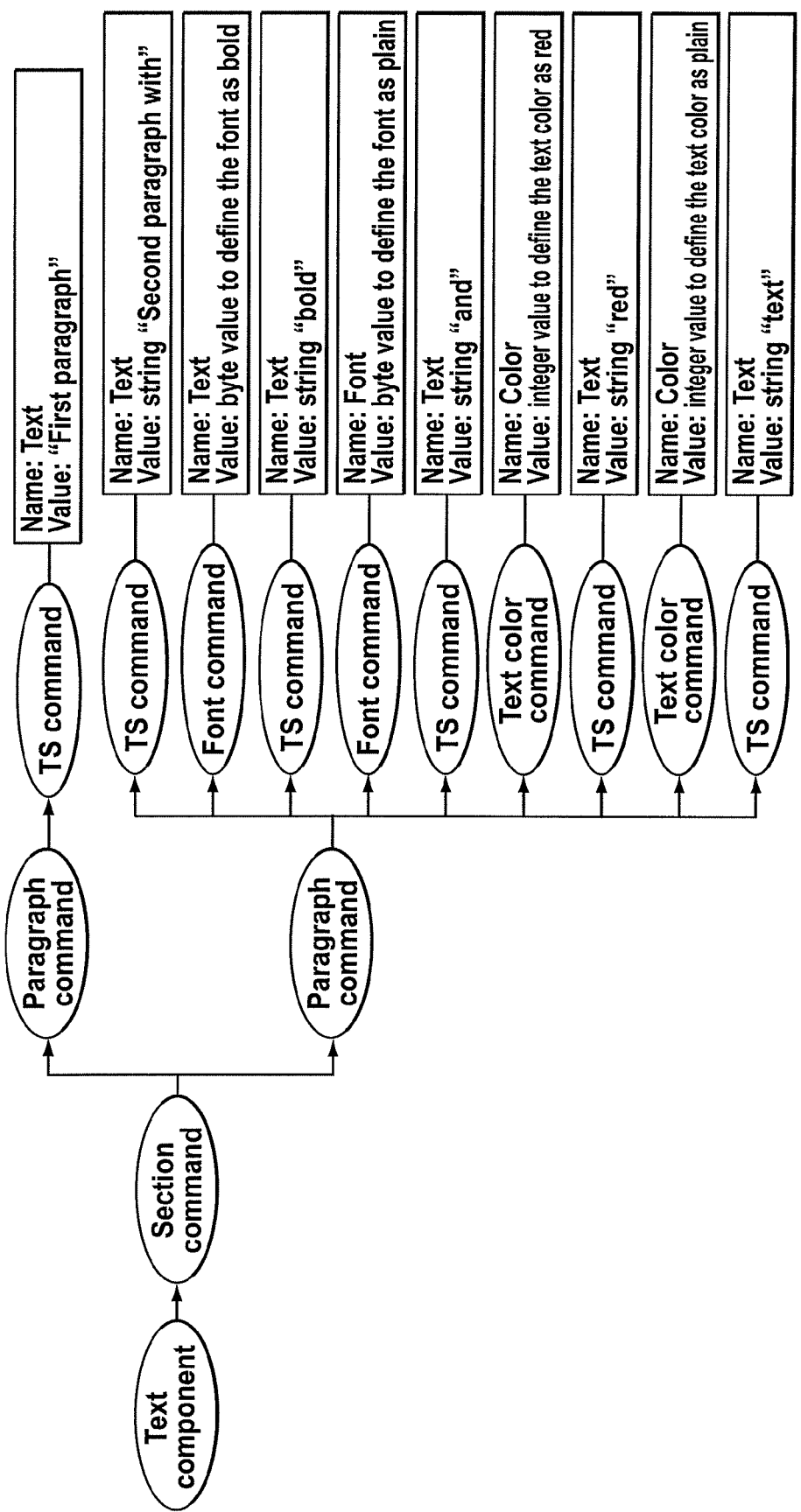
FIG. 7 shows an exemplary DOM structure for a word processing document.

Using the following sample text document, the corresponding document DOM structure is shown in FIG. 7:

First paragraph.
Second paragraph with bold and red text.

As FIG. 7 demonstrates, the section command, which is the child of the text component, consists of two paragraph commands. The first paragraph command contains one text segment command and the text content for that paragraph is added as an attribute to the text segment command. The second paragraph command has a relatively more complex structure, as the text properties in the paragraph are much richer. Each time a text property (font, text color, etc.) changes, a corresponding text property command is created and the change value is added to that command as an attribute. The subsequent text segment command records the text with the same text property as an attribute. As document structure gets richer and more complex, more commands of corresponding types are created and the document properties are added as attributes to those commands.

The table component has the same three types of commands as the text component, but different command names. The document DOM structure for the sample table document below is shown in FIG. 8:

| Cell One | Cell Two |
| Cell Three | Cell Four |

Figure 8:
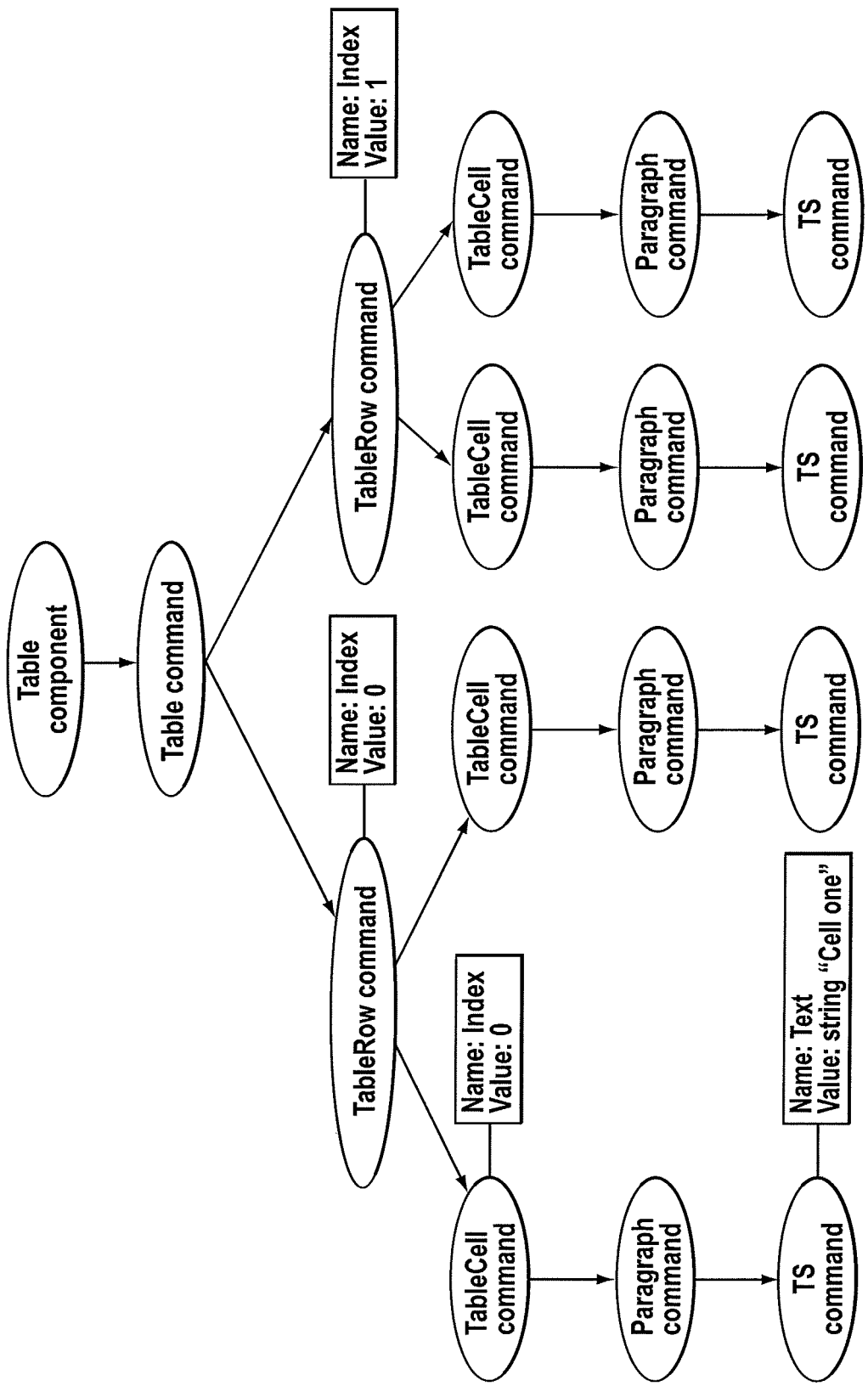
FIG. 8 shows an exemplary DOM structure for a table document.

As shown in the FIG. 8, the table component has physical entity type commands of table, TableRow and TableCell, where the TableCell command can contain all available commands for the text component. In the example above, the first child TableRow command of the table command has an attribute "Index" defined by value of O. This indicates that the indicated table row is the first one defined in the table. The attribute of the leftmost table cell command in FIG. 8 has the same meaning.

Figure 9A:
FIG. 9A shows a sample word processing document containing an image subdocument.

A document sometimes contains subdocuments, for example images, tables, text boxes etc. The DOM structure set forth herein uses a reference command to point to the graph of such subdocuments. Thus, for the sample document of FIG. 9A, the attachment server 28 generates the DOM structure shown in FIG. 9B.

Figure 9A:
Figure 9B:
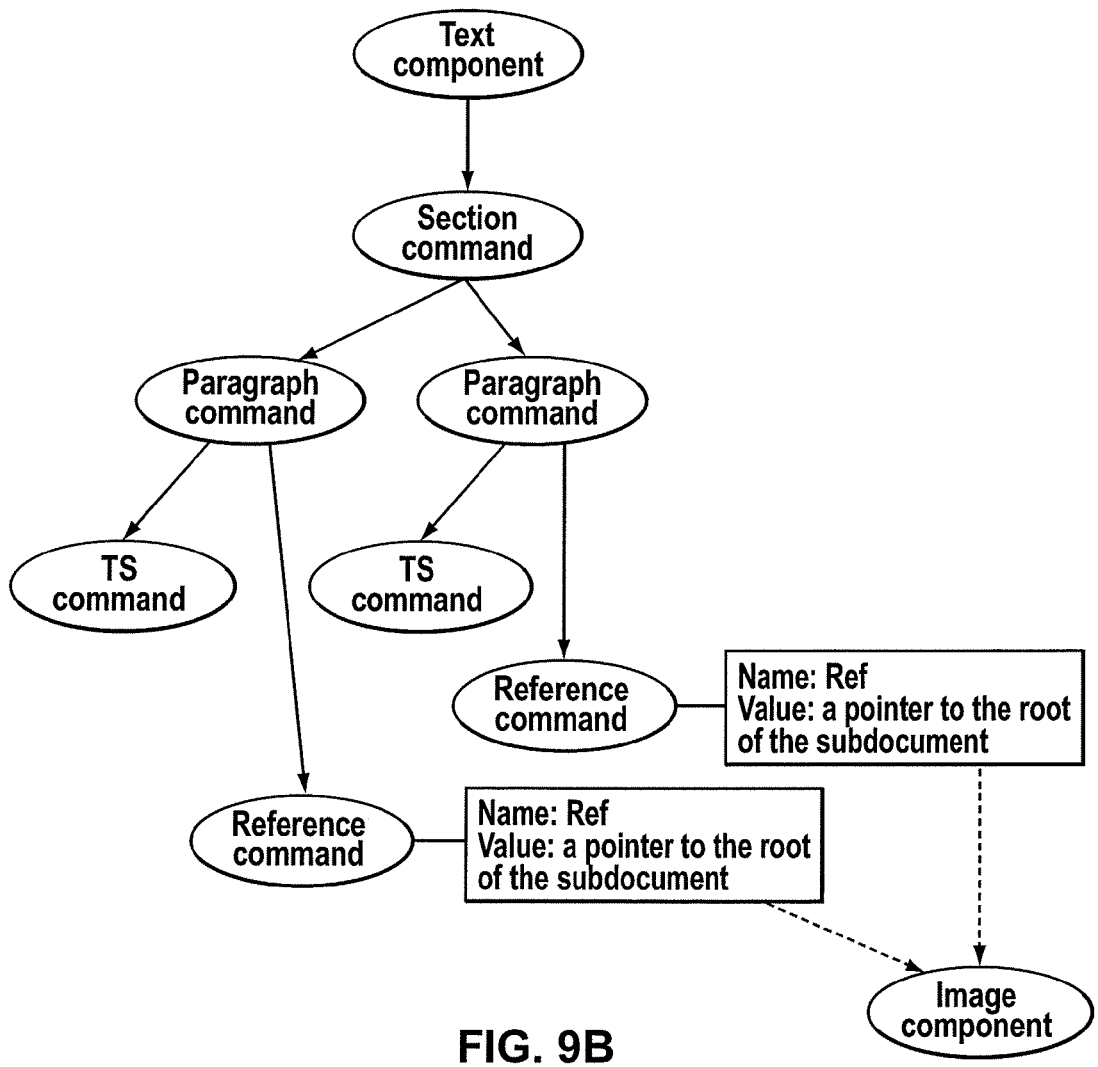
FIG. 9B shows an exemplary DOM structure therefore.

The structure shown in FIG. 9 is identical to that discussed above in connection with FIGS. 7 and 8, except for the attributes of the two reference commands. The attachment server 28 constructs the image in "Sample Three" as a separate image component, which contains all of the image data in its own DOM hierarchy. In the DOM structure for the main document, the values of the "Ref" attributes of those two reference commands point to the image component, as indicated by the dashed lines, such that the DOM structure connects together all parts of the document.

Figure 10:
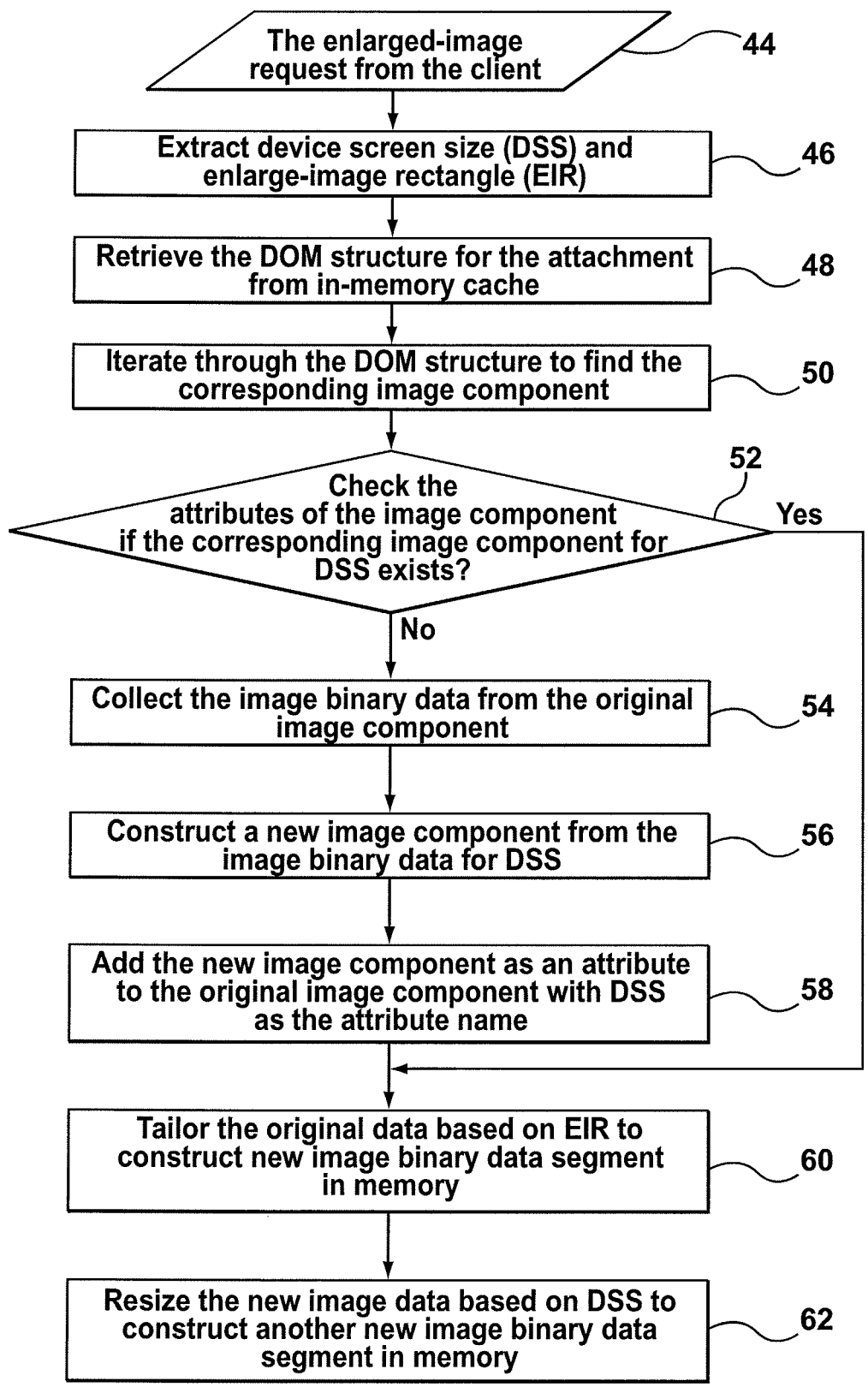
FIG. 10 is a flowchart showing enlarge area image processing on the server, according to the preferred embodiment.

Returning now to the preferred embodiment with reference to FIG. 10, when the attachment server 28 receives an "Enlarge Area" image request for an attachment (step 44), it first extracts the screen size information for the mobile communication device 12 and the crop rectangle parameters from the request (step 46). After retrieving the document DOM structure for the attachment from the in-memory document DOM cache (step 48), the server 28 traverses through the document DOM structure to find out the corresponding image component in the DOM structure for that image (step 50). The server 28 then iterates through the attributes of the image component to determine if a separate image component specifically for that screen size has already been constructed (step 52).

This separate image component contains the same graphic information as the original image but is usually of smaller size (equal to or less than the device screen size), thus consuming much less device memory (usually in ratio of 1:15 to 1:20). If the separate image component does not exist, the attachment server 28 collects the image binary data from the original image component in memory (step 54) and constructs the new image component from the binary data (step 56).

At step 58, the server 28 caches the DSS image component as an attribute of the original image component in the DOM structure. These two image components contain essentially the same graphic information except that the original image component has a much higher resolution. A person skilled in the art will appreciate that this solution will consume appreciable memory if there are a lot of different mobile device DSS definitions. Therefore, as an alternative, it would be possible to construct the DSS image component each time the server receives an "Enlarge Area" request, without caching it. However, based on the premise that time is a more critical factor in wireless operation than the hardware deployment cost, caching the DSS image component is employed in the preferred embodiment.

Similar to the operation of the separate image component construction, the attachment server 28 creates a new image data segment in memory by tailoring the original image binary data based on the crop rectangle parameters (step 60), and resizes the new image data segment based on the device screen size to create the final image data segment (step 62).

In summary, the "Enlarge Area" device/server feature allows users to quickly retrieve any relevant part of a large image attachment that has been resized by the server. This minimizes bandwidth usage, device memory/CPU consumption, and request/response latency while still allowing the user to view an image area in its original (native) level of detail.

A person skilled in the art, having read this description of the preferred embodiment, may conceive of variations and alternative embodiments.

All such variations and alternative embodiments are believed to be within the ambit of the claims appended hereto.

What is claimed is:

1. A method comprising:
   transmitting, from a server to a device, original size data for an image;
   receiving a request at the server from the device to enlarge an area of the image, the image previously transmitted to the device from the server, the request comprising translated crop rectangle coordinates derived from the area to be enlarged and the original size data;
   building a graph structure representing a map of the image;
   constructing a new image component from binary data collected from the image;
   caching the new image component as an attribute of the image in the graph structure;
   modifying the binary data based on the translated crop rectangle coordinates and an image size limit associated with the device to create an enlarged area of the image; and
   transmitting an enlarged area of the image for display.

2. The method of claim 1, wherein the graph structure is a Document Object Model (DOM).

3. The method of claim 1, further comprising:
   prior to the receiving the request to enlarge the area of the image, receiving a request from the device for the image, the request including the image size limit; and thereafter
   transmitting the image to the mobile communication device, the image being re-sized in the event that the dimensions thereof exceed the image size limit.

4. The method of claim 3, wherein the image size limit is indicative of at least one of screen size and display resolution of the mobile communication device.

5. The method of claim 1, further comprising:
   traversing the graph structure to locate any corresponding image component for the original image and, upon locating the corresponding image component, determining if a separate image component has been constructed for the image size limit; and
   the constructing the new image component from the binary data occurs when the separate image component has not been constructed and the constructing comprising collecting initial image binary data from the image.

6. A method comprising:
   transmitting, from a server to a device, original size data for an image, when there is not a pending enlarge area request;
   receiving a request at the server from the device to enlarge an area of the image, the request comprising translated crop rectangle coordinates derived from the area to be enlarged and the original size data;
   building a graph structure representing a map of the image;
   traversing the graph structure to locate any corresponding image component for the image and, upon locating the corresponding image component iterating through attributes of the image component to determine if a separate image component has been constructed for an image size limit associated with the device;
   when the separate image component has not been constructed, collecting initial image binary data from the image and constructing a new image component from the binary data;
   caching the new image component as an attribute of the image in the graph structure;
   collecting and modifying the image binary data from the image based on the translated crop rectangle coordinates and the image size limit to create an enlarged area of the image when: a width of the image is greater than an image size width limit; or a height of the image is greater than image size height limit; and
   transmitting an enlarged area of the image for display.

7. The method of claim 6, wherein the graph structure is a Document Object Model (DOM).

8. A server comprising:
   a hardware element for transmitting original size data for an image, when there is not a pending enlarge area request;
   a hardware element for receiving a request to enlarge an area of the image, the request comprising translated crop rectangle coordinates derived from the area to be enlarged and the original size data;
   a hardware element for building a graph structure representing a map of the image;
   a hardware element for traversing the graph structure to locate any corresponding image component for the image and, upon locating the corresponding image component iterating through attributes of the image component to determine if a separate image component has been constructed for an image size limit associated with the device;
   a hardware element for, when the separate image component has not been constructed, collecting initial image binary data from the image and constructing a new image component from the binary data;
   a hardware element for caching the new image component as an attribute of the image in the graph structure;
   a hardware element for collecting and modifying the image binary data from the image based on the translated crop rectangle coordinates and the image size limit to create an enlarged area of the image when: a width of the image is greater than an image size width limit; or a height of the image is greater than image size height limit; and
   a hardware element for transmitting an enlarged area of the image for display.

* * * * *